United States Patent
McCormick et al.

(10) Patent No.: US 12,290,080 B2
(45) Date of Patent: May 6, 2025

(54) SWEETENED DAIRY PRODUCTS WITH STEVIOL GLYCOSIDES AND LACTASE ENZYME

(71) Applicant: Danone US, LLC, White Plains, NY (US)

(72) Inventors: Casey McCormick, Poughquag, NY (US); Margaret Havekottw, Fairfield, CT (US); Thierry Saint-Denis, Westfield, NJ (US)

(73) Assignee: Danone US, LLC, White Plains, NY (US)

( * ) Notice: Subject to any disclaimer, the term of this patent is extended or adjusted under 35 U.S.C. 154(b) by 8 days.

(21) Appl. No.: 17/967,661

(22) Filed: Oct. 17, 2022

(65) Prior Publication Data

US 2023/0046150 A1 Feb. 16, 2023

Related U.S. Application Data

(63) Continuation of application No. 16/062,773, filed as application No. PCT/US2016/068331 on Dec. 22, 2016, now Pat. No. 11,470,851.

(60) Provisional application No. 62/387,416, filed on Dec. 24, 2015, provisional application No. 62/387,392, filed on Dec. 24, 2015, provisional application No. 62/387,393, filed on Dec. 24, 2015, provisional application No. 62/387,391, filed on Dec. 24, 2015.

(51) Int. Cl.

| | | |
|---|---|---|
| A23C 9/127 | (2006.01) | |
| A23C 9/12 | (2006.01) | |
| A23C 9/123 | (2006.01) | |
| A23C 9/13 | (2006.01) | |
| A23C 9/152 | (2006.01) | |
| A23C 9/156 | (2006.01) | |
| A23C 11/10 | (2021.01) | |
| A23C 19/09 | (2006.01) | |
| A23C 21/02 | (2006.01) | |
| A23L 11/65 | (2021.01) | |
| A23L 27/30 | (2016.01) | |

(52) U.S. Cl.
CPC .......... *A23C 9/1275* (2013.01); *A23C 9/1206* (2013.01); *A23C 9/123* (2013.01); *A23C 9/1307* (2013.01); *A23C 9/1322* (2013.01); *A23C 9/1522* (2013.01); *A23C 9/1526* (2013.01); *A23C 9/1528* (2013.01); *A23C 9/156* (2013.01); *A23C 11/106* (2013.01); *A23C 19/0925* (2013.01); *A23C 21/023* (2013.01); *A23C 21/026* (2013.01); *A23L 11/65* (2021.01); *A23L 27/36* (2016.08); *A23C 2260/05* (2013.01); *A23V 2002/00* (2013.01)

(58) Field of Classification Search
CPC .................................................... A23C 9/1275
USPC ........................................................... 426/584
See application file for complete search history.

(56) References Cited

U.S. PATENT DOCUMENTS

| | | | | |
|---|---|---|---|---|
| 4,956,186 | A | * | 9/1990 | Streiff ................. A23C 9/1307 |
| | | | | 426/583 |
| 2007/0116830 | A1 | * | 5/2007 | Prakash ............. A23C 19/0925 |
| | | | | 426/548 |
| 2010/0112130 | A1 | | 5/2010 | Abelyan et al. |

FOREIGN PATENT DOCUMENTS

| | | |
|---|---|---|
| EP | 1254664 A2 | 11/2002 |
| EP | 2954786 A1 | 12/2015 |
| WO | 2012/125991 A2 | 9/2012 |
| WO | 2014114970 A1 | 7/2014 |
| WO | 2014/185931 A1 | 11/2014 |
| WO | 2015/008103 A1 | 1/2015 |
| WO | 2015/193459 A1 | 12/2015 |

OTHER PUBLICATIONS

International Search Report and Written Opinion from International Application No. PCT/US2016/068331 dated May 31, 2017.
"Strawberry Flavored Yogurt", Mintel; May 2015.
Lactose Free Chocolate Flavored Milk, Mintel; Aug. 2014.
"Taste profile of stevia improved with oligofructose", Sensus—Technical Paper, Jun. 20, 2013, pp. 1-6.
"Taste profile of stevia improved with oligofructose", DairyReporter.com—Sensus Technical Paper, Jun. 30, 2013, pp. 1-3.
Turowski et al., "Frutalose SF75: AH-natural, low-calorie sweetener", Sensus America, inc., Apr. 1, 2015.
Tami me et al., "The Production of Yoghurt & Concentrated Yoghurt from Hydrolysed Milk", Cultured Dairy Products Journal, Aug. 1978, pp. 16-21.
Esrnerino et al., "The influence of sweeteners in pro biotic Petit Suisse clleese in concentrations equivalent to tllat of sucrose", J. Dairy Sci. 96: 5512-5521, 2013.
Cardelli et al. "Inulin and oligofructose improve sensory quality and increase tile probiotic viable count in potentially synbiotic petit-suisse cheese", LVVT 4•1 (2008) pp. 1037-1046.

* cited by examiner

*Primary Examiner* — Brent T O'Hern
(74) *Attorney, Agent, or Firm* — Greenberg Traurig, LLP

(57) ABSTRACT

The invention concerns a sweetened dairy product comprising a dairy material, at least one steviol glycoside, and a lactase enzyme.

16 Claims, No Drawings

SWEETENED DAIRY PRODUCTS WITH STEVIOL GLYCOSIDES AND LACTASE ENZYME

CROSS-REFERENCE

This international application filed herewith claims priority to U.S. Provisional Patent Application No. 62/387,391, filed on Dec. 24, 2015, U.S. Provisional Patent Application No. 62/387,392, filed on Dec. 24, 2015, U.S. Provisional Patent Application No. 62/387,393, filed Dec. 24, 2015, and U.S. Provisional Patent Application No. 62/387,416, filed Dec. 24, 2015, the entire contents of which are incorporated by reference in their entirety.

The invention concerns sweetened dairy products comprising at least one steviol glycoside. The products deliver a sugar-like character.

Stevie extracts, comprising steviol glycosides, are known sweeteners. These are used in various products, including beverages and food. Some sweetened dairy products comprising stevia extracts are available on the market. Various steviol glycosides ingredients, with various compositions, are available on the market as extracts obtained from stevia plants, or as compounds synthetized by microbiological processes. The later are also referred to as "fermentive stevia". While these ingredients have been designed to efficiently deliver sweetness and attempt to reduce aftertaste, there is still a need for sweetened dairy compositions delivering a sugar-like character (overall character being close to sugar). Indeed one can observe with some sweeteners a high sweetening power but that does not correspond to sugar. A sugar-like character is considered as being more than solely sweetness.

The invention addresses at least one of the needs or problems mentioned above with a sweetened dairy product comprising:
a dairy material,
at least one steviol glycoside, and
a lactase enzyme.

The invention also concerns processes for making such products.

Definitions

In the present specification, unless otherwise specified, the percentages are percentages by weight.

Product General Features

The product is a dairy composition based on a dairy material. Such materials are known and further described below. The dairy material is typically a matrix or substrate wherein other components or ingredients are comprised, for example solubilized, dispersed, emulsified, suspended etc. . . . The composition can comprise fruit and/or at least one flavor.

Other components or ingredients can be introduced via an intermediate preparation, such as a slurry of a fruit preparation. The intermediate composition can comprise some of the ingredients or components, such as the at least one steviol glycoside. Thus the product can comprise the dairy material and an intermediate preparation, mixed or arranged as layers or discrete inclusions.

In one embodiment the product comprises a fermented dairy composition. The product can be itself a fermented dairy composition. Such compositions, based on a dairy material are known by the one skilled in the art, and are further described below. It is mentioned that the product can comprise a fermented dairy composition and an intermediate preparation, mixed or arranged as layers or discrete inclusions.

In one embodiment the fermented dairy composition is a strained fermented dairy composition. Such compositions, typically obtained by separation of whey, are known by the one skilled in the art and are further described below. It is mentioned that the product can comprise a strained fermented dairy composition and an intermediate preparation, mixed or arranged as layers or discrete inclusions.

The ratio by weight between the dairy material or dairy composition and the intermediate preparation can be for example of from 50/50 to 99/1, preferably from 60/40 to 95/5.

It is mentioned that the dairy product, the dairy material, the fermented dairy composition and/or the strained fermented dairy composition are preferably a heat-treated products or compositions, for example pasteurized or sterilized. Heat-treatments are known by the one skilled in the art. They allow an elimination of parasite micro-organisms. They can be performed in conventional heat exchangers, such as tubes or plates heat exchangers. The heat treatment can be for example performed at a temperature of from 80° C. to 99° C., preferably 85° C. to 95° C., for example during from 1 minute to 15 minutes.

The dairy product can comprise a source of fat. The source is typically the dairy material. The dairy product can have for example a fat content of from 0.01% to 8.00% by weight. The natures, compositions and amounts of ingredients or components in the product, for example of dairy material, as well as the processing steps, particularly straining or separation steps, can be adapted to have these contents. It is believed that the presence of some fat, even in low amounts, can contribute in positively compensating, as to sugar-like perception, defaults of the steviol glycoside(s).

The dairy product typically comprises a source of protein. The source is typically the dairy material. The dairy product can have for example a protein content of from 0.5% to 12.0% by weight. The natures, compositions and amounts of ingredients or components in the product, for example of dairy material, as well as the processing steps, particularly straining or separation steps, can be adapted to have these contents. It is believed that presence of protein contributes in positively compensating, as to sugar-like perception, defaults of the steviol glycoside(s).

The product is typically contained in a sealed container such as a packaging. The process can typically involve a step of conditioning the product in a container. The container is then typically sealed, for example with a cap or a lid. The container can be for example a container of 50 ml (or 50 g), to 1 L (or 1 kg), for example a container of 50 ml (or 50 g) to 80 ml (or 80 g), or 80 ml (or 80 g) to 100 ml (or 100 g), or 100 ml (or 100 g) to 125 ml (or 125 g), or 125 ml (or 125 g) to 150 ml (or 150 g), or 150 ml (or 150 g) to 200 ml (or 200 g), or 200 ml (or 200 g) to 250 ml (or 250 g), or 250 ml (or 250 g) to 300 ml (or 300 g), or 300 ml (or 300 g) to 500 ml (or 500 g), or 500 ml (or 500 g) to 750 ml (or 750 g), or 750 ml (or 750 g) to 1 L (or 1 kg).

The product can be stored, transported and/or distributed at a chilled temperature of 0° C. to 10° C., preferably of 4° C. to 10° C.

Steviol Glycoside(s)

The dairy product comprises at least one steviol glycoside. Such compounds for example include Rebaudioside A, Rebaudioside B, Rebaudioside C, Rebaudioside D, Rebaudioside M, stevioside, Rebaudioside F, Dulcoside A, Rubusoside, and Steviolbioside. They are available on the market as ingredients, in more or less purified forms, often provided as mixtures. They can be obtained by extraction from stevia, with some optional refining steps and/or blending steps. More recently some microbiological processes have been developed to make such compounds and mixtures from stevia or stevia extracts or from other compounds, with microorganisms such as yeasts or fungi. Steviol glycosides are sweeteners, providing sweetness to the products or compositions, that are thus considered as sweetened.

In a preferred embodiment the at least one steviol glycoside is a steviol glycoside composition comprising:
Rebaudioside B,
at least one of Rebaudioside A, Rebaudioside D and Rebaudioside M, and
optionally stevioside.

The steviol glycoside composition can comprise other steviol glycosides such as Rebaudioside C, Rebaudioside F, Dulcoside A, Rubusoside, and/or Steviolbioside.

It is mentioned that the steviol glycoside composition can be provided as a mixture, wherein the compounds are provided together, or as an association wherein the compounds are provided separately, optionally as sub-mixtures.

Commercial ingredients are typically mixtures of the compounds. One can obtain the desired composition by using commercial ingredients having an appropriate composition, or by mixing or associating at least two commercial ingredients or intermediates having different compositions.

In a preferred embodiment the at least one steviol glycoside is a steviol glycoside composition comprising:
Rebaudioside B,
Rebaudioside A, and
optionally stevioside.

In a preferred embodiment the at least one steviol glycoside is a steviol glycoside composition comprising:
Rebaudioside B,
Rebaudioside A, and
stevioside.

In a particular embodiment, the at least one steviol glycoside is a steviol glycoside composition comprising:
Rebaudioside B,
Rebaudioside D, and
optionally Rebaudioside A.

In a particular embodiment, the at least one steviol glycoside is a steviol glycoside composition comprising:
Rebaudioside B,
Rebaudioside M, and
optionally Rebaudioside A.

Hereafter the group consisting of Rebaudioside B, Rebaudioside A and stevioside is referred to as "group SG 1". Hereafter the group consisting of Rebaudioside C, Rebaudioside D, Rebaudioside M, Rebaudioside F, Dulcoside A, Rubusoside, and Steviolbioside is referred to as "group SG2"

In a preferred embodiment the steviol glycoside composition comprises:
from 50 to 75% by weight of Rebaudioside A,
from 5 to 10% by weight of Rebaudioside B, and
from 20 to 40% by weight of Stevioside, with respect to the sum of the amounts of Rebaudioside A, Rebaudioside B, and Stevioside.

In other words, in this embodiment group SG1 has from 50 to 75% by weight of Rebaudioside A, from 5 to 10% by weight of Rebaudioside B, and from 20 to 40% by weight of Stevioside.

In a particular embodiment the steviol glycoside composition includes:
100 parts by weight of the group SG1
from 0 to 300 parts by weight, of group SG2, preferably from 0 to 100 parts, for example from 1 to 50 parts.

It is mentioned that the steviol glycosides ingredients compositions or components can be provided as mixtures with compounds different from steviol glycosides of group SG1 and group SG2, hereafter referred to as "other compounds". In a preferred embodiment, such ingredients compositions or components are comprised of the following:
100 parts by weight of steviol glycosides of group SG1 and/or group SG2, and
from 0 to 100 parts by weight, of other compounds, preferably from 0 to 66 parts, for example from 1 to 50 parts.

The dairy product preferably comprises from 50 to 5000 ppm by weight of the at least one steviol glycoside, preferably from 50 to 2500 ppm, preferably from 100 to 1000 ppm, for example from 100 to 200 ppm, or from 200 to 300 ppm, or from 300 to 400 ppm, or from 400 to 500 ppm, or from 500 to 600 ppm, or from 600 to 700 ppm, or from 700 to 800 ppm, or from 800 to 900 ppm, or from 900 to 1000 ppm.

The dairy product preferably comprises from 50 to 5000 ppm by weight of group SG1, preferably from 50 to 2500 ppm, preferably from 100 to 1000 ppm, for example from 100 to 200 ppm, or from 200 to 300 ppm, or from 300 to 400 ppm, or from 400 to 500 ppm, or from 500 to 600 ppm, or from 600 to 700 ppm, or from 700 to 800 ppm, or from 800 to 900 ppm, or from 900 to 1000 ppm.

The dairy product preferably comprises:
from 5 to 500 ppm by weight of Rebaudioside B, preferably from 5 to 250 ppm, preferably from 10 to 100 ppm, for example from 10 to 20 ppm, or from 20 to 30 ppm, or from 30 to 40 ppm, or from 40 to 50 ppm, or from 50 to 60 ppm, or from 60 to 70 ppm, or from 70 to 80 ppm, or from 80 to 90 ppm, or from 90 to 100 ppm,
from 100 to 10000 ppm by weight of Rebaudioside A, preferably from 100 to 5000 ppm, preferably from 200 to 2000 ppm, for example from 200 to 400 ppm, or from 400 to 600 ppm, or from 600 to 800 ppm, or from 800 to 1000 ppm, or from 1000 to 1200 ppm, or from 1200 to 1400 ppm, or from 1400 to 1600 ppm, or from 1600 to 1800 ppm, or from 1800 to 2000 ppm, and
from 50 to 5000 ppm by weight of stevioside, preferably from 50 to 2500 ppm, preferably from 100 to 1000 ppm, for example from 100 to 200 ppm, or from 200 to 300 ppm, or from 300 to 400 ppm, or from 400 to 500 ppm, or from 500 to 600 ppm, or from 600 to 700 ppm, or from 700 to 800 ppm, or from 800 to 900 ppm, or from 900 to 1000 ppm.

In an embodiment the dairy product comprises:
from 5 to 500 ppm by weight of Rebaudioside B, preferably from 5 to 250 ppm, preferably from 10 to 100 ppm, for example from 10 to 20 ppm, or from 20 to 30 ppm, or from 30 to 40 ppm, or from 40 to 50 ppm, or from 50 to 60 ppm, or from 60 to 70 ppm, or from 70 to 80 ppm, or from 80 to 90 ppm, or from 90 to 100 ppm,
from 100 to 10000 ppm by weight of Rebaudioside D, preferably from 100 to 5000 ppm, preferably from 200 to 2000 ppm, for example from 200 to 400 ppm, or from 400 to 600 ppm, or from 600 to 800 ppm, or from 800 to 1000 ppm, or from 1000 to 1200 ppm, or from 1200 to 1400 ppm, or from 1400 to 1600 ppm, or from 1600 to 1800 ppm, or from 1800 to 2000 ppm, and optionally from 50 to 5000 ppm by weight of Rebaudioside A, preferably from 50 to 2500 ppm, preferably from 100 to 1000 ppm, for example from 100 to 200 ppm, or from 200 to 300 ppm, or from 300 to 400 ppm, or from 400 to 500 ppm, or from 500 to 600 ppm, or from 600 to 700 ppm, or from 700 to 800 ppm, or from 800 to 900 ppm, or from 900 to 1000 ppm.

In an embodiment the dairy product comprises:

from 5 to 500 ppm by weight of Rebaudioside B, preferably from 5 to 250 ppm, preferably from 10 to 100 ppm, for example from 10 to 20 ppm, or from 20 to 30 ppm, or from 30 to 40 ppm, or from 40 to 50 ppm, or from 50 to 60 ppm, or from 60 to 70 ppm, or from 70 to 80 ppm, or from 80 to 90 ppm, or from 90 to 100 ppm, from 100 to 10000 ppm by weight of Rebaudioside M, preferably from 100 to 5000 ppm, preferably from 200 to 2000 ppm, for example from 200 to 400 ppm, or from 400 to 600 ppm, or from 600 to 800 ppm, or from 800 to 1000 ppm, or from 1000 to 1200 ppm, or from 1200 to 1400 ppm, or from 1400 to 1600 ppm, or from 1600 to 1800 ppm, or from 1800 to 2000 ppm, and optionally from 50 to 5000 ppm by weight of Rebaudioside A, preferably from 50 to 2500 ppm, preferably from 100 to 1000 ppm, for example from 100 to 200 ppm, or from 200 to 300 ppm, or from 300 to 400 ppm, or from 400 to 500 ppm, or from 500 to 600 ppm, or from 600 to 700 ppm, or from 700 to 800 ppm, or from 800 to 900 ppm, or from 900 to 1000 ppm.

It is believed that, with the lactase enzyme, the at least one steviol glycoside, preferably the steviol glycoside compositions as disclosed above provide a better sugar-like taste, especially sugar-like profile. They together also allow avoiding or reducing the use of flavor modulators and thus allow more naturality.

Enzymes

The product comprises a lactase enzyme. It is believed also that the use of lactase enzymes contributes to impart a more sugar like-profile, especially as to temporal profile, together with the at least one steviol glycoside. It also reduces lactose and/or energy density of the product.

The lactase can be any kind of lactase such as Ha-lactase™ 5200 marketed by Chr Hansen or Maxilact® Lgi 5000 marketed by DSM.

Advantageously the lactase enzyme is introduced in the dairy material such that at least 80%, preferably at least 90%, preferably 95% of lactose of the dairy material is degraded to glucose and galactose, preferably at pH above 5.0 preferably at a fermentation temperature. The lactase can advantageously be added in an amount of 0.005 wt % to 0.20 wt %, in particular 0.01 wt % to 0.15 wt %, preferably 0.02 wt % to 0.06 wt %, based on the total weight of the dairy material. The lactase can advantageously be added in an amount of 0.005 wt % to 0.20 wt %, in particular 0.01 wt % to 0.15 wt %, preferably 0.02 wt % to 0.06 wt %, based on the total weight of the dairy material. The lactase can for example be used in an amount of from 2000 to 4000 Neutral Lactase Units per Liter of dairy material.

The lactase and the bacteria can be added to the dairy material simultaneously or separately. Advantageously, the lactase is added before or along with the bacteria.

Preferably, the lactase is added before the bacteria, notably 10 to 40 min before the bacteria, in particular 20 to 30 min before the culture of bacteria.

Further Additives

The dairy product can comprise at least at least one additive selected from the group consisting of a polysaccharide of fructose units, salts, and their mixtures or associations.

Herein mixtures or associations refer to addition together as a mixture, or separately, optionally via one or several intermediate preparation. Preferably the further additives are introduced as an association in a single intermediate preparation.

The salt can comprise a sodium or potassium cation and a chloride anion. The salt is preferably NaCl. The salt is preferably a sea salt composition. It is believed the use of the salt contributes to impart a more sugar like-profile, especially as to temporal profile, together with the at least one steviol glycoside. Unexcitingly the salt can act with the sweetening at least one steviol glycoside to provide a better sugar-like temporal profile, with lowering aftertastes such as steviol glycoside(s) linger. It is believed that the salt can induce with the dairy composition a salivation that synergizes with the other components, including the steviol glycoside and/or fat and/or proteins to deliver the temporal profile. Unexpectedly the salt can act with the steviol glycoside composition to provide a better sugar-like temporal profile, with lowering aftertastes and/or improving mouthfeel.

The salt can be present in an intermediate preparation in an amount of from 0.5% to 5% by weight, for example from 1.0% to 3.0%. The salt can be present in the dairy product in an amount of from 0.04% to 0.40% by weight, from example from 0.08% to 0.30%.

The polysaccharide of fructose units can be a dimer, oligomer or polymer having several fructose units, for example an inulin or a FructoOligoSaccharide (FOS). Such polysaccharides are known by the one skilled in the art and available on the market. Preferably the FOS has a number-average or weight-average number of Fructose units (Degree of Polymerization DP) of lower than 20, preferably lower 10, for example from 3 to 5. Preferably the FOS is substantially free of free fructose. Examples of suitable ingredients are Frutalose® 75 marketed par NCI or Beneo Orafti P95. It is believed the use of such polysaccharides with the at least one steviol glycoside improves the mouthfeel and/or contributes to impart a temporal profile closer to sugar than the profiles obtained with steviol glycosides alone. The polysaccharide of fructose units can be present in the dairy product in an amount of from 0.04% to 0.40% by weight, from example from 0.5% to 10.0% by weight, for example from 1.0% to 8.0%, for example from 0.5% to 1.0%, or from 1.0% to 2.0%, or from 2.0% to 3.0%, or from 3.0% to 4.0%, or from 4.0% to 5.0%, or from 5.0% to 6.0%, or from 6.0% to 7.0%, or from 7.0% to 8.0%.

In a preferred embodiment the dairy product comprises both the polysaccharide of fructose units and the salt. For example the dairy product can comprise:

from 0.04% to 0.40% by weight, preferably from 0.08% to 0.30% of the salt, and from 0.5% to 10.0% by weight, preferably from 1.0% to 8.0% of the polysaccharide of fructose units.

Dairy Material

The dairy material is typically comprised of milk and/or ingredients obtained from milk. It is also referred to as a "milk-based composition". Herein milk encompasses animal milk, such as cow's milk, and also substitutes to animal milk, such as vegetal milk, such as soy milk, rice milk, coconut milk, almond milk etc. . . .

Milk-based compositions useful in such products and/or processes are known by the one skilled in the art of dairy products, preferably of fermented dairy products. Herein a milk-based composition encompasses a composition with milk or milk fractions, and compositions obtained by mixing several previously separated milk fractions. Some water or some additives can be added to said milk, milk fractions and mixtures. Preferably the milk is an animal milk, for example cow's milk. Some alternative animal milks can be used, such as sheep milk or goat milk.

The milk-based composition can typically comprise ingredients selected from the group consisting of milk, half skimmed milk, skimmed milk, milk powder, skimmed milk powder, milk concentrate, skim milk concentrate, milk proteins, cream, buttermilk and mixtures thereof. Some water or additives can be mixed therewith. Examples of additives that can be added include sugar, sweeteners different from sugar, fibers, and texture modifiers.

The milk-based composition can typically have a fat content of from 0.0% to 5.0% by weight, for example of from 0.0% to 1.0% or from 1.0% to 2.0% or from 2.0% to 3.0% or from 3.0% to 4.0% or from 4.0% to 5.0%. The "fat content" of a composition corresponds to the weight of the fat components present in the composition relatively to the total weight of the composition. The fat content is expressed as a weight percentage. The fat content can be measured by the Weibull-Berntrop gravimetric method described in the standard NF ISO 8262-3. Usually the fat content is known for all the ingredients used to prepare the composition, and the fat content of the product can is calculated from these data.

The milk-based composition can typically have a protein content of from 2.0% to 6.0% by weight, for example of from 2.0% to 3.0% or from 3.0% to 4.0% or from 4.0% to 5.0% or from 5.0% to 6.0%. The "protein content" of a composition corresponds to the weight of the proteins present in the composition relatively to the total weight of the composition. The protein content is expressed as a weight percentage. The protein content can be measured by Kjeldahl analysis (NF EN ISO 8968-1) as the reference method for the determination of the protein content of dairy products based on measurement of total nitrogen. Nitrogen is multiplied by a factor, typically 6.38, to express the results as total protein. The method is described in both AOAC Method 991.20 (1) and international Dairy Federation Standard (IDF) 206:1993. Usually the total protein content is known for all the ingredients used to prepare the product, and total protein content is calculated from these data.

The dairy material, also referred to as milk-based composition, can comprise lactose. The amount of lactose can be typically of from 3.80% to 5.00% by weight.

In one embodiment the dairy material has the following contents (% by weight):
from 3.0% to 3.5% of milk protein
from 0.0% to 3.5% of fat
from 3.80% to 5.00% of lactose.

The pH of the milk can for example be of from 6.60 to 7.00, before optional acidification for example by fermentation. The dry matter of the milk can be for example of from 6.8% to 13.0%. In one embodiment the milk is a low-fat milk comprising less than 2.0% fat by weight, preferably less than 1.0% of fat, preferably less than 0.5% fat, preferably less than 0.1%, for example less than 0.01%. The milk can be for example a skimmed milk.

The ingredients of the milk-based composition and/or the amounts thereof can be selected to have the amounts of proteins and/or fat and/or lactose mentioned above.

Fermented Dairy Composition

Fermented dairy compositions typically comprise bacteria, preferably lactic acid bacteria, preferably alive.

Fermented dairy compositions are typically obtained by a process involving a fermentation step with at least one lactic acid bacteria. In this step the dairy material is inoculated with the lactic acid bacteria, and the mixture is then allowed to ferment at a fermentation temperature. Such inoculation and fermentation operations are known by the one skilled in the art.

During fermentation, the lactic acid bacteria produce lactic acid and thus cause a pH decrease. With the pH decreasing proteins coagulate to form a curd, typically at a breaking pH.

The fermentation temperature can be of from 30° C. to 45° C., preferably from 35° C. to 40° C., with a pH decrease to a breaking pH at which proteins coagulate to form a curd.

The breaking pH is preferably of from 3.50 to 5.50, preferably of from 4.0 to 5.0, preferably from higher than 4.5 to 5.0.

Bacteria

Appropriate bacteria for fermentation are known by the one skilled in the art. It is mentioned that lactic acid bacteria are often referred to as ferments or cultures or starters. Examples of lactic acid bacteria that can be used for the fermentation include:

Lactobacilli, for example *Lactobacillus acidophilus, Lactobacillus casei, Lactobacillus plantarum, Lactobacillus reuteri, Lactobacillus johnsonii, Lactobacillus helveticus, Lactobacillus brevis, Lactobacillus rhamnosus,*

Streptococci, for example *Streptococcus thermophilus,*

Bifidobacteria, for example *Bifidobacterium bifidum, Bifidobacterium longum, Bifidobacterium breve, Bifidobacterium animalis,*

Lactococci, for example *Lactococcus lactis,*

*Propionibacterium* such as *Propionibacterium freudenreichii, Propionibacterium freudenreichii* ssp *shermanii, Propionibacterium acidipropionici, Propionibacterium thoenii,* mixtures or association thereof.

The lactic acid bacteria preferably comprise, preferably essentially consist of, preferably consist of, *Lactobacillus delbrueckii* ssp. *bulgaricus* (i.e. *Lactobacillus bulgaricus*) and *Streptococcus salivarius* ssp. *thermophilus* i.e. (*Streptococcus thermophilus*) bacteria. The lactic acid bacteria used in the invention typically comprise an association of *Streptococcus thermophilus* and *Lactobacillus bulgaricus* bacteria. This association is known and often referred to as a yogurt symbiosis.

In some particular embodiments the lactic acid bacteria might comprise probiotic bacteria. Probiotic bacteria are known by the one skilled in the art. Examples of probiotic bacteria include some Bifidobacteria and Lactobacilli, such as *Bifidobacterium brevis, Bifidobacterium animalis animalis, Bifidobacterium animalis lactis, Bifidobacterium infantis, Bifidobacterium longum, Lactobacillus helveticus, Lactobacillus casei, Lactobacillus casei paracasei, Lactobacillus acidophilus, Lactobacillus rhamnosus, Lactobacillus plantarum, Lactobacillus reuteri, Lactobacillus delbrueckiisubspbulgaricus, Lactobacillus delbrueckiisubsplactis, Lactobacillus brevis* and *Lactobacillus fermentum.*

In one embodiment the lactic acid bacteria do not comprise Bifidobacteria. In one embodiment the lactic acid bacteria do not comprise *Lactobacillus acidophilus* bacteria. In one embodiment the lactic acid bacteria do not comprise Bifidobacteria and do not comprise *Lactobacillus acidophilus* bacteria.

The lactic acid bacteria can be introduced in any appropriate form, for example in a spray-dried form or in a frozen form. The introduction of the lactic acid bacteria in the dairy material is also referred to as an inoculation.

Strained Fermented Dairy Product

Strained fermented dairy compositions are typically obtained by a process involving a separation step. In this step an acid whey composition is separated from the curd resulting from the proteins coagulation. Thus one obtains:
- a fermented dairy product, typically comprising the proteins coagulum, referred to a a strained fermented dairy composition, and
- an acid whey by-product.

Such separation steps are known by the one skilled in art, for example in processes of making "greek yogurts". The separation can for example be carried out by reverse osmosis, ultrafiltration, or centrifugal separation. The separation step can be performed for example at a temperature of from 30° C. to 45° C.

The acid whey by-product can comprise lactose or enzyme degradation products such as glucose and/or galactose. In one embodiment an amount of from 65% to 90% by weight, preferably from 70% to 85%, with reference to the amount of dairy material, of acid-whey by-product is recovered.

The strained fermented dairy composition is recovered at the separation step. As much water is been removed as part of the acid whey by-product, the strained fermented dairy composition comprises high amounts of proteins, especially of casein.

The strained fermented dairy product comprises lactic acid bacteria, wherein the lactic acid bacteria comprise at least one lactic acid bacteria having a low lactose metabolization capacity. All the features mentioned above about lactic acid bacteria used in the fermentation step apply to the lactic acid bacteria comprised in the strained dairy fermented product.

The strained fermented dairy composition preferably has the following contents (% by weight):
- from 8.5% to 11.0% of milk protein
- from 0.0% to 8.0% of fat, for example from 0.0% to 3.5% or from 3.5% to 8.0%
- from 0.00% to 4.20% of lactose, for example from 2.80% to 4.20% The pH of the strained fermented dairy composition can for example be of from 3.80 to 4.65.

Intermediate Preparations

Intermediate preparations are known by the one skilled in the art. They typically used to modify the taste, the mouthfeel and/or texture of a dairy composition, for example of a fermented dairy composition or a strained fermented composition. They can be used also to introduce some additives such as nutrients. They typically comprise sweetening agents, flavors, color modifiers, cereals and/or fruit. Intermediate preparations are for example slurries or fruit preparations. Flavors include for example fruit flavors, vanilla flavors, caramel flavors, coffee flavors, chocolate flavors. The fruit preparations typically comprise fruits. Herein fruits refer to any fruit form, including for example full fruits, pieces, purees, concentrates, juices etc. The intermediate preparation typically comprises the at least one steviol glycoside and optionally the at least one additive selected from the group consisting of a polysaccharide of fructose units, salts, and their mixtures or associations. Typically a fruit preparation can be added in an amount of 5-35% by weight with reference to the total amount of product.

The intermediate preparation or slurry typically comprises a stabilizing system, having at least one stabilizer. The stabilizing system can comprise at least two stabilizers. Such stabilizers are known by the one skilled in the art. They typically help in avoiding phase separation of solids, for examples of fruits or fruits extracts and/or in avoiding syneresis. They typically provide some viscosity to the composition, for example a viscosity (Bostwick viscosity at 20° C.) of from 1 to 20 cm/min, preferably of from 4 to 12 cm/min.

The stabilizing system or the stabilizer can for example be a starch, a pectin, a guar, a xanthan, a carrageenan, a locust bean gum, or a mixture thereof. The amount of stabilizing system is typically of from 0.5 to 5% by weight.

The intermediate preparation can typically comprise organoleptic modifiers. Such ingredients are known by the one skilled in the art.

The organoleptic modifiers can be for example sweetening agents different from sugar and the at least one steviol glycoside, coloring agents, cereals and/or cereal extracts.

Examples of sweetening agents are ingredients referred to as High Intensity Sweeteners, such as sucralose, acesulfamK, aspartam, saccharine, D-allulose, erythritol, Luo Han Guo.

Examples of fruits include for example strawberry, peach, apricot, mango, apple, pear, raspberry, blueberry, blackberry, passion, cherry, and mixtures or associations thereof, such as peach-passion.

The fruits can be for example provided as:
- frozen fruit cubes, for example 10 mm fruit cubes, for example Individual Quick Frozen fruit cubes, for example strawberry, peach, apricot, mango, apple, pear fruit cubes or mixtures thereof,
- Aseptic fruit cubes, for example 10 mm fruit cubes, for example strawberry, peach, apricot, mango, apple or pear fruit cubes or mixtures thereof,
- fruit purees, for example fruit purees concentrated from 2 to 5 times, preferably 3 times, for example aseptic fruit purees, for example strawberry, peach, apricot, mango, raspberry, blueberry or apple fruit purees or mixtures thereof,
- single aseptic fruit purees, for example strawberry, raspberry, peach, apricot, blueberry or apple single aseptic fruit purees or mixture thereof,
- frozen whole fruits, for example Individual Quick Frozen whole fruits, for example blueberry, raspberry or blackberry frozen whole fruits, or mixtures thereof,
- mixtures thereof.

The ingredients and/or components of the intermediate preparation and the amounts thereof can be typically such that the composition has a brix degree of from 1 to 65 brix, for example from 1 to 10 brix, or from 10 to 15 brix, or from 15 to 20 brix, or from 20 to 25 brix, or from 25 to 30 brix, or from 30 to 35 brix, or from 35 to 40 brix, or from 40 to 45 brix, or from 45 to 50 brix, or from 50 to 55 brix, or from 55 to 60 brix, or from 55 to 60 brix, or from 60 to 65 brix.

A fruit preparation can for example comprise fruit in an amount of from 30% to 80% by weight, for example from 50 to 70% by weight.

The intermediate preparation can comprise water. It is mentioned that a part of the water can come from ingredients used to prepare the fruit preparation, for example from fruits or fruit extracts or from a phosphoric acid solution.

The fruit preparation can comprise pH modification agents such as citric acid. The fruit preparation can have a pH of from 2.5 to 5, preferably of from 2.8 to 4.2.

Processes

The dairy product can be prepared by any appropriate process. The process can depend on the type of product and composition needed. For example fermented dairy compositions will require a fermentation step. Some main steps such as heat treatments, fermentation, and separation or straining have been described above.

In a particular embodiment the product is prepared by a process comprising the steps of:

step a) preparing a dairy composition comprising the dairy material and the lactase enzyme, and step b) adding an intermediate composition comprising the at least one steviol glycoside.

In a particular embodiment the dairy material comprises lactose and the dairy composition comprises a lactase enzyme.

In a particular embodiment the dairy composition is a fermented dairy composition.

Step a) can comprise the following steps:

a1) providing a milk composition comprising lactose, a2) adding the enzyme and at least partially hydrolyzing the lactose, a3) inoculating lactic acid bacteria, and a4) allowing fermentation of the milk composition.

In a particular embodiment the fermented dairy composition is a strained fermented dairy composition, and wherein step a) further comprises the following subsequent step:

a5) separation to obtain a strained fermented dairy composition and an acid whey by-product.

The process can also comprise steps such as:

homogenization steps, for example before or after the heat treatment step, preferably at a pressure of from 20 bars to 300 bars, in particular from 50 bars to 250 bars, cooling steps, for example cooling down from a heat-treatment temperature to a fermentation temperature, or from a fermentation temperature to a storage temperature, for example a chilled storage temperature of from 4° C. to 10° C.

smoothing the fermented dairy composition, typically involving some agitation and/or shear, for example performed by agitation, or by static or dynamic smoothing.

Use of the Final Product or Composition

The product is typically to be used as a food product. It is typically used by oral administration. One can typically eat or drink the product by processing it from a container to the mouth, optionally with using a spoon or a straw.

Further details or advantages of the invention might appear in the following non limitative examples.

EXAMPLES

Example 1—Strained Fermented Dairy Composition

A strained fermented dairy composition is prepared with the following dairy mix formulation:

| | |
|---|---|
| Condensed Milk (34%) | 6.42% |
| Culture Yo-Mix ® 495, Dupont | 0.004% |
| Lactase Maxilact ® LGI 5000, DSM | 2850 NLU/L |
| Skim Milk | To 100% |

The dairy mix has a fat content of 0.1% by weight and a protein content of about 3.4% by weight.

A strained fermented dairy composition is prepared according to the following procedure:

homogenization at a temperature of 60° C., at a pressure of 69 bars, heat treatment of milk at a temperature of 95° C. during 6.5 minutes, cooling to 40° C.

addition of enzyme inoculation of milk at 40° C. with culture fermentation at a temperature of 40° C. to reach a breaking pH of 4.65, separation, at a temperature of 41.5° C., of 72% of whey, with a Westphalia KNA3 pilot scale centrifuge separator, to obtain:

A) a strained dairy fermented product, and

B) an acid whey by-product, and dynamic smoothing, performed on the strained fermented dairy product.

The strained fermented dairy composition has a protein content of 10.6% and a fat content of 0.3%.

Example 2: Slurry Intermediate Compositions

The following slurry intermediate compositions are prepared.

| Ingredient | Supplier and reference | Quantity % |
|---|---|---|
| Slurry a) | | |
| Oligofructose | Frutalose ® 75, NCl | 94.66 |
| Steviol Glycosides | Blend of steviol glycosides 1* | 0.25 |
| Water | / | QS |
| Fruit and Vegetable Juice Concentrate (for color) | / | 0.20 |
| Vanilla Flavor | / | 1.25 |
| Sea Salt | / | 0.19 |
| Sodium Citrate | / | 0.10 |
| Malic Acid | / | 0.04 |
| Slurry b) | | |
| Oligofructose | Beneo Orafti P95 | 58.00 |
| Steviol Glycosides | Blend of steviol glycosides 2** | 0.686 |
| Water | / | QS |
| Fruit Juice Concentrate (for color) | / | 9.00 |
| Fruit and Vegetable Juice Concentrate (for color) | / | 4.00 |
| Caramel Flavor | / | 2.444 |
| Sea Salt | / | 1.41 |
| Sodium Citrate | / | 0.10 |
| Malic Acid | / | 0.03 |

*Blend of steviol glycoside 1: proprietary blend comprising: 85 wt % of compounds selected from Rebaudioside D, Rebaudioside A, Rebaudioside C, Rebaudioside F, Stevioside, Rebaudioside B, Dulcoside A, Rubusoside, Steviolbioside, and Rebaudioside M, with a profile of 88.3% of Rebaudioside A, 8.1% stevioside, 3.3% Rebaudioside B, and 15 wt % of other compounds.

**Blend of steviol glycoside 2: proprietary blend comprising: 74 wt % of compounds selected from Rebaudioside D, Rebaudioside A, Rebaudioside C, Rebaudioside F, Stevioside, Rebaudioside B, Dulcoside A, Rubusoside, Steviolbioside, and Rebaudioside M, with a profile of 0.2% of Rebaudioside D, 88.3% of Rebaudioside A, 3.1% of Rebaudioside D, 0.7% of Rebaudioside F, 8.1% of stevioside, 3.3% of Rebaudioside B, 0.5% of Dulcoside A, 0.3% of Rubososide, 0.5% of Steviolbioside, and 26 wt % of other compounds.

Example 3

Flavored products: The following products are prepared by mixing the strained fermented dairy compositions and the slurries.

|  | Product 1 | Product 2 |
| --- | --- | --- |
| Strained fermented dairy composition | 92 wt % | 92 wt % |
| Slurry | 8 wt % slurry a) | 8 wt % slurry b) |

Both products present a good sweetness, with product 2 delivering more sweetness than product 1. Both present with a good sugar-like organoleptic profile, with a temporal profile that is close to profiles obtained with similar formulations including sugar. Both products deliver a creamy texture in mouth, much more so than a non-fat strained yogurt would. Both have a very sugar-like character, with almost no artificial aftertaste, more specifically the aftertaste typically associated with *Stevia* extracts.

The invention claimed is:

1. A sweetened dairy product comprising:
    a dairy material,
    at least one steviol glycoside, and
    a lactase enzyme,
        wherein the lactase enzyme comprises 0.01% to 0.15% by weight of the dairy material.

2. A product according to claim 1, wherein the at least one steviol glycoside comprises at least one compound selected from the group consisting of Rebaudioside A, Rebaudioside B, Rebaudioside C, Rebaudioside D, Rebaudioside M and stevioside.

3. A product according to claim 1, wherein the at least one steviol glycoside is a steviol glycoside composition comprising Rebaudioside B, at least one of Rebaudioside A, Rebaudioside D and Rebaudioside M, and optionally stevioside.

4. A product according to claim 1, further comprising at least one additive selected from the group consisting of:
    a polysaccharide of fructose units,
    a salt, and
    mixtures or associations thereof.

5. A product according to claim 4, wherein the salt comprises a sodium or potassium cation and a chloride anion.

6. A product according to claim 4, wherein the salt is a sea salt composition.

7. A product according to claim 4, wherein the polysaccharide of fructose units is an inulin or a FructoOligoSaccharide (FOS).

8. A product according to claim 7, wherein the polysaccharide of fructose units is FructoOligoSaccharide (FOS) compound having an average number of Fructose units of from 3 to 5.

9. A product according to claim 1, comprising a source of fat.

10. A product according to claim 9, having a fat content of from 0.01% to 8.00% by weight.

11. A product according to claim 1, comprising a source of protein.

12. A product according to claim 11, having a protein content of from 0.5% to 12.0% by weight.

13. A product according to claim 1, further comprising at least one of fruit or at least one flavor.

14. A product according to claim 1, wherein the dairy material comprises animal milk.

15. A product according to claim 1, comprising a fermented dairy composition and optionally an intermediate composition.

16. A product according to claim 15, wherein the fermented dairy composition is a strained fermented dairy composition.

* * * * *